United States Patent [19]

St. Louis

[11] Patent Number: 5,573,587
[45] Date of Patent: Nov. 12, 1996

[54] PROCESS FOR PRODUCING BUILDING MATERIALS FROM PAINT SLUDGE

[75] Inventor: Daniel M. St. Louis, West Bloomfield, Mich.

[73] Assignee: Haden Schweitzer Corporation, Madison Heights, Mich.

[21] Appl. No.: 259,969

[22] Filed: Jun. 14, 1994

[51] Int. Cl.⁶ ............................................. C04B 18/04
[52] U.S. Cl. ................... 106/697; 106/792; 106/795; 106/796; 106/798; 106/799; 106/800
[58] Field of Search .................................. 106/697, 792, 106/796, 798, 799, 795, 800; 210/751; 423/155

[56] References Cited

U.S. PATENT DOCUMENTS

| | | | |
|---|---|---|---|
| 2,409,546 | 10/1946 | Corson | 106/792 |
| 3,873,351 | 3/1975 | Ueda et al. | 106/798 |
| 4,661,527 | 4/1987 | Seng | 210/732 |
| 4,701,220 | 10/1987 | Seng | 106/660 |
| 5,004,550 | 2/1991 | Beckman et al. | 210/710 |
| 5,087,375 | 2/1992 | Weinwurm | 210/751 |
| 5,160,628 | 11/1992 | Gerace et al. | 210/751 |
| 5,238,583 | 8/1993 | Fortson | 210/751 |
| 5,240,509 | 8/1993 | Rey et al. | 210/712 |
| 5,254,263 | 10/1993 | Gerace et al. | 210/751 |
| 5,259,977 | 11/1993 | Girovich et al. | 210/751 |

FOREIGN PATENT DOCUMENTS 4233600  3/1994  Germany.

OTHER PUBLICATIONS

Chemical Abstracts, vol. 115, No. 2, Abstract No. 14277a, Jul. 15, 1991.
Chemical Abstracts, vol. 106, No. 26, Abstract No. 218657y, Jun. 29, 1987.
Database WPI, Section CH, week 7643, JP 51,103,175A, Sep. 12, 1976.

Primary Examiner—Mark L. Bell
Assistant Examiner—Michael Marcheschi
Attorney, Agent, or Firm—Niro, Scavone, Haller & Niro

[57] ABSTRACT

An process for manufacturing a admixture for concrete, mortar or asphalt out of paint sludge is discussed; The preferred embodiment utilizes the chemical drying of paint sludge through the addition of lime. The resulting powder contains a mixture of slaked lime and paint solids and can be used in the formation of concrete, mortar or asphalt.

10 Claims, No Drawings

PROCESS FOR PRODUCING BUILDING MATERIALS FROM PAINT SLUDGE

BACKGROUND OF THE INVENTION

I. Field of the Invention

The present invention relates generally to a process for producing building materials from recycled paint sludge. More specifically, the present invention relates to a chemical drying process for mixing paint sludge with quick-lime or calcium oxide (CaO) and producing calcium hydroxide $Ca(OH)_2$, a valuable and integral component for use in mortar, concrete, and asphalt. My invention includes a process involving the chemical drying of paint sludge through the use of lime, thus creating a powder made of paint solids and slaked lime suitable as a component in asphalt, concrete and mortar.

Recently, increasing environmental concerns and federal regulations have sought to limit the type and quantity of waste generated by the automotive paint industry. In response to this problem, manufacturers have developed various methods for creating useful byproducts from automotive paint sludge.

When an automobile is painted in a paint booth, the excess paint solids are collected beneath the paint booth, typically in a water-based system. The material recovered from such processes, either by chemical separation, membrane technology, filtration, or scrubbing, is known as paint sludge. Disposal of paint sludge is a problem of considerable complexity that faces paint booth operators. Currently available disposal technology is based upon the principles of incineration, chemical and physical treatment, and solidification. The resulting end product of such technology is a typically used as landfill. However, these paint sludge and products currently include components of concern because of the potential environmental hazards they create. Thus, the use of paint sludge and products in landfilling has its limitations. Accordingly, there is a need for a simple process that effectively uses all of the paint solids generated by a paint booth facility.

Our invention utilizes a chemical treatment process of paint sludge that results in the production of a fine powdered $Ca(OH)_2$ (slaked lime) and dried paint solids. This mixture is an acceptable alternative to a conventional slaked lime used as an admixture for concrete or mortar. The present invention utilizes paint sludge comprising 30–100% by weight paint solids that is mixed with quick-lime. The preferred embodiment of this invention pretreats the sludge with caustic soda (NaOH) in order to react with and reduce any free aluminum to aluminum oxide in the paint sludge. This pretreatment avoids or eliminates bulging which could otherwise cause cracking and crumbling which could weaken or destroy the end cement product. Thus, the present invention provides a superior constituent ingredient for use in the creation of construction materials while providing an efficient method for the recycling of paint sludge.

II. Description of the Prior Art

U.S. Pat. No. 5,160,628 (Gerace et al.) teaches a method for making a filler from automotive paint sludge. Gerace teaches a two step process for handling paint sludge. First, Gerace requires the mechanical removable of water from paint sludge. Second, Gerace uses chemical drying agents to remove further water and to produce a dried paint sludge powder containing uncured polymer.

The present invention avoids the absolute necessity for mechanical water removal that Gerace teaches. Also, Gerace stresses the importance of keeping the temperature of the sludge below 100° F. to avoid curing the polymer resin in the paint sludge. The present invention, by contrast, specifically requires the exothermic reaction that results from mixing quick-lime and water, raising the temperature of the resulting mixture toward the boiling point of water. Further, the exothermic reaction of the present invention results in a greater speed of reaction, thus drying the paint sludge mixture more quickly. Also, the present invention does not necessarily have as strict a limitation with respect to producing cured or uncured polymer resin in the resulting product. Thus, Gerace is directed to a different kind of paint sludge product that is produced through fundamentally different reaction techniques.

U.S. Pat. No. 5,259,977 (Girovich et al.) teaches a method and apparatus for the treatment of sewage sludge. Girovich teaches the desirability of an agglomerization or pelletization step in the treatment of organic sludge. Girovich further discloses the use of quick-lime in the treatment of organic sludge for the purposes of diminishing odors and neutralizing pathogens. The present invention, by contrast, seeks the production of a fine powder admixture for the manufacture of cement. Further, while the present invention uses calcium oxide in the treatment of paint sludge, its use is directed toward the chemical drying of the sludge and creation of a useful resulting product, not the neutralization of organic pathogens.

U.S. Pat. No. 5,004,550 (Beckman et al.) teaches a method of paint sludge conversion for disposal. Beckman teaches the addition of detackification agents to paint sludge in order to float the resulting product out of a paint sludge pit for disposal. Beckman, however, provides no teaching as to any process for reusing paint sludge. Thus, Beckman presents the very problem that the present invention seeks to overcome.

U.S. Pat. No. 5,238,583 (Forston, et al.) teaches a method for converting a contaminated waste material into an innocuous granular substance. Forston specifically teaches the use of a calcium oxide, mixed with an inorganic oxide to reduce a waste sludge to an innocuous granular substance while neutralizing environmentally unacceptable compounds. The present invention, by contrast, is capable of practice with only one chemical drying agent, calcium oxide. Further, the present invention, unlike Forston, seeks to provide an environmentally acceptable reuse for significant volume of paint sludge, rather then merely making such sludge acceptable for landfill placement.

In short, none of the prior art, alone or in combination suggests a process for creating an inexpensive, environmentally desirable admixture for cement with equal or greater functional capability than cement made from ordinary calcium hydroxide. Specifically, none of the prior art discloses adding quick-lime to paint sludge that has been pretreated with caustic soda.

SUMMARY OF THE INVENTION

The present invention provides a process and a resultant product for the reuse of accumulated water-based paint sludge from paint booth operations. The process comprises the steps of:

a. mixing the paint sludge with caustic soda (NaOH) so as to chemically stabilize free aluminum (typically, aluminum flake) contained in the sludge;

b. mixing the paint sludge and caustic soda admixture with quick-lime (CaO) so as to chemically react and transform water within said paint sludge, and;

c. agitating said paint sludge caustic soda and quick-lime admixture so as to minimize any localized concentrations of paint solids.

The present invention is further directed to cement, mortar, masonry cement, asphalt, and similar building materials that utilize hydrated lime resulting from the process described above. For instance, mortar could be manufactured through the mixture of sand and the hydrated lime/paint solids mixture. Likewise, cement could be manufactured through the addition of alumina and silica to the hydrated lime/paint solids mixture of the present invention.

It is therefore one object of the present invention to treat a waste paint sludge to create a resultant powder material which is useful as a constituent in the formation of cement, mortar, and the like.

It is a further object of the present invention to produce a cement or similar construction material with equal or superior performance characteristics that includes a mixture of hydrated lime and paint solids derived from the treatment of paint sludge.

It is still a further object of the present invention to create a readily available! and less expensive constituent component of cement and similar building materials.

It is a further object of the present invention to create a quicker process for the drying of paint sludge.

It is yet a further object of the present invention to create a reusable product for a significant volume of automotive paint sludge.

These and other objects and advantages of the present invention will become apparent to those skilled in the art from of reading of the following detailed description of the preferred embodiments and the appended claims.

DETAILED DESCRIPTION OF THE PREFERRED EMBODIMENT

It will be appreciated by those skilled in the art that the waste paint sludge treated in accordance with the present invention is a complex material and is different from most other waste sludges. First, such sludge can include volatile organic compounds ("VOC's"), such as thinner, solvents and detackifying agents. Second, such sludges include uncured polymeric paint resins that can "cure," that is cross-link, upon the heating and volatization, of its constituent liquid component. Thus, paint sludges can become very sticky when dried. Third, paint sludges can include inorganic pigments and heavy metals. These components are often hazardous and/or toxic. All of these component problems are dealt with in the present invention.

The raw paint sludge from the paint booth operations contains on the order of approximately 50% by paint solids and 50% water. The present invention, however, can include the treatment of paint sludges having anywhere from approximately 30% to almost 100% by weight paint solids. Any paint sludge mixtures having significantly less than 30% by weight paint solids could be further concentrated by placing the mixture in a settling pond where the separated, concentrated paint sludge could be treated. Any paint sludge mixture having to high a concentration of paint solids could be pretreated with a sufficient amount of water so as to be capable of completely reacting with the quick-lime.

The first step of a preferred embodiment of my inventive process for treating paint sludge includes mixing the raw paint sludge with caustic soda (NaOH). Caustic soda is used to stabilize any aluminum that is often found in automotive paint sludge. Free aluminum, typically aluminum flakes, are commonly used in automotive paints for producing greater reflectivity or shininess. Aluminum has been found to adversely impact the performance of cement ultimately produced through the admixture of the present process. Powdered caustic soda is the preferred agent for pretreating paint sludge that is intended for ultimate use in cement products because: 1) it does not alter the mechanical properties of the slaked lime/paint solids product; 2) it is strong, inexpensive, and readily available; and 3) it generates sufficient heat upon dissolution in to the paint sludge to facilitate reaction with the free aluminum. Thus, the first mixing step preferably requires mixing caustic soda at approximately 1..0 molar concentration (i.e., 1 gmol of NaOH per liter of water in the sludge, assuming approximately 50% water weight in the sludge), although concentrations ranging from approximately 0.2 to 5.0 molar are also acceptable. This range of concentrations is directly proportional to the percentage of aluminum within the paint sludge. Ideally, the present invention calls for mixing just enough sodium hydroxide to reduce substantially all of the free aluminum in a paint sludge.

The second step of this preferred embodiment is to heat the caustic soda/paint sludge mixture to a temperature of approximately 60° C. for approximately 10 minutes. This step is inherent in the case of mixing powdered sodium hydroxide with the paint sludge. The mixing of powdered sodium hydroxide, which is preferred in this embodiment, generates sufficient heat of dissolution upon mixing with the water in the paint sludge. However, if sodium hydroxide in an aqueous solution is used, heat may be provided from another source. This heating step facilitates the reaction of the caustic soda and the free aluminum in the paint sludge, thus causing the formation of hydrogen bubbles. This pretreatment prevents any subsequent "bulging" problems with the resulting cement product and is believed to thus avoid weakening the resulting end product.

The third step in this preferred embodiment is to mix the paint sludge caustic soda with quick-lime (CaO) so as to chemically react and transform the water in the paint sludge. This second mixing step is performed ideally by adding approximately 1.6 kg of quick-lime for each kilogram of paint sludge. This ratio is assumed to be optimal as the paint sludge is about 50% by weight water, and the molecular weights of quick-lime (56 g/tool) and water (18 g/mol) require about 3.1 kg of quick-lime to react completely with 1 kg water, although the present invention envisions a range from approximately I to 5 kg quick-lime for each kilogram of water. The quick-lime mixes with the water in the paint sludge in a highly exothermic reaction:

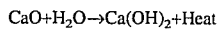

$$CaO + H_2O \rightarrow Ca(OH)_2 + Heat$$

Preferably, the present process results in a hydrated lime $Ca(OH)_2$/paint solids mixture that is approximately 75%/25% by weight.

This preferred embodiment of the present invention includes a final step of agitating the admixture so as to minimize any localized concentrations of paint solids. This agitation is produced mechanically through standard plow-paddle or pug mill mixers. This agitation further ensures the efficient mixing of the quick-lime with the raw paint sludge, thus quickly eliminating any unpleasant odor produced by the raw paint sludge.

The invention will now be described more specifically with reference to a working example and a proposed example. The invention, however, is not limited to the examples described.

EXAMPLE 1

A scaled up test of the present invention was completed with excellent results. The method used was to charge a standard, six foot cubic capacity portable cement mixer with 40 pounds of sludge (approximately 50% by weight water) and approximately 35 pounds of quick-lime. The mixer then ran the resulting mixture for approximately one half hour. The resulting chemical produced a fine powder made up of slaked or hydrated lime and paint solids.

The exothermic nature of the reaction resulted in a temperature increase during the first ten minutes of mixing and then seemed to stabilize. This thermal stabilization is believed to result from the boiling of the water in the paint sludge.

There is no indication that the resin within the paint sludge was cured or uncured. The product powder was more manageable and did not stick to the mixer at all.

Some small lumps of sludge were not broken up by the mixer in the process. These lumps were not cured and could be easily broken down. This result indicated that a more vigorous mixing apparatus is desirable, such as any standard pug mill, plow, or paddle mixer.

Very little odor was detected during the mixing process. In fact, the worst odor came from the raw paint sludge and diminished upon the addition of quick-lime.

Finally, it was noticed that this mixing process had a tendency to kick up significant amounts of dust. This problem was remedied by the placement of a filter over the mouth of the mixer, although this problem would be addressed by the use of any closed mixing device.

Cement produced from the sludge/slaked lime powder related to this process was found to have strength 35% over the ASTM strength requirements for cement.

EXAMPLE 2

A second proposed test of the present would be conducted as followed. The method would place approximately 30 kilograms of sludge in a container with approximately 0.6 kilograms of powdered sodium hydroxide. The heat of dissolution of a sodium hydroxide would heat the resulting mixture to approximately 60° C. for about 10 minutes, wherein hydrogen bubbles would be forming.

Next, the method would use standard paddle mixer with 30 kilograms of sludge (approximately 50% by weight water) and approximately 48 kilograms of quick-lime. The mixer would then mix the resulting composition for approximately ten minutes. The resulting mixture would produce a fine powder made up of approximately 75% by weight slaked or hydrated lime and 25% paint solids.

The powder produced from the present process would be particularly suited for manufacture of ASTM standard type S or type M cement.

Of course, it should be noted that various changes and modifications to the preferred embodiments of this invention will be apparent to those skilled in the art, such changes and modifications can be made without departing from the spirit and scope of the present invention. For example a further preferred embodiment of the present invention would not require the addition of caustic soda where bulging is not a concern in the resulting cement product, or where aluminum is not present in any significant quantities. An additional alternative embodiment could envision the use of a different caustic solution or even an acid to pretreat and reduce free aluminum in the paint sludge. An acid, for instance, might be preferable in circumstances where an admixture product having a more neutral pH would be desired. It is, therefore, intended that such changes and modifications be covered by the following claims.

I claim:

1. A process for treating paint sludge containing water and paint solids to produce building materials containing lime, comprising the steps of:
   a. mixing the paint sludge with quick-lime to chemically react the quick-lime with at least a portion of the water within the paint sludge to form a mixture of hydrated lime and paint solids, resulting in an exothermic reaction permitting at least some of the water to boil;
   b. further mixing the paint sludge to minimize the presence of concentrations of the paint solids in the mixture; and
   c. adding one or more materials to the mixture to produce building materials containing lime.

2. The process of claim 1, wherein the paint sludge comprises between 30% and 99% by weight paint solids.

3. The process of claim 1, wherein the materials added to the mixture include sand to form mortar.

4. The process of claim 1, wherein the materials added to the mixture include alumina and silica to form cement.

5. The process of claim 1, wherein the step of adding paint sludge to quick-lime comprises adding approximately 3.1 kilograms of quick-lime to the paint sludge for each kilogram of water in the paint sludge.

6. A process for preparing building materials containing lime, by treating a paint sludge containing water, solvent, paint solids, and free aluminum, said method comprising the steps of:
   a. mixing the paint sludge with a caustic solution to chemically stabilize the free aluminum;
   b. mixing the paint sludge with quick-lime to chemically react with the water and to form a mixture of hydrated lime and paint solids;
   c. agitating the paint sludge to minimize the presence of concentrations of paint solids in the mixture; and
   d. adding one or more materials to the mixture to produce building materials containing lime.

7. The process of claim 6, wherein the caustic solution comprises caustic soda, and the caustic soda is mixed with the paint sludge in an amount which comprises between 0.2 and 5.0 molar concentration.

8. The process of claim 6, wherein between approximately 1 to 5 kilograms of quick-lime is added to the paint sludge for each kilogram of water within the paint sludge.

9. The process of claim 6, wherein approximately 3.1 kilograms of quick-lime is added to the paint sludge for each kilogram of water in the paint sludge.

10. The process of claim 1, wherein the amount of the quick-lime mixed with the paint sludge is less than the amount necessary to chemically react with all of the water in the paint sludge, but is enough to provide sufficient heat to boil off any unreacted water.

* * * * *